(12) United States Patent
Suzuki

(10) Patent No.: US 9,991,926 B2
(45) Date of Patent: Jun. 5, 2018

(54) COVER SET

(71) Applicant: Asterisk, Inc., Osaka-shi, Osaka (JP)

(72) Inventor: Noriyuki Suzuki, Osaka (JP)

(73) Assignee: ASTERISK, INC., Osaka (JP)

( * ) Notice: Subject to any disclaimer, the term of this patent is extended or adjusted under 35 U.S.C. 154(b) by 0 days. days.

(21) Appl. No.: 15/268,148

(22) Filed: Sep. 16, 2016

(65) Prior Publication Data

US 2017/0070257 A1 Mar. 9, 2017

Related U.S. Application Data

(63) Continuation-in-part of application No. 15/253,589, filed on Aug. 31, 2016.

(30) Foreign Application Priority Data

Sep. 4, 2015 (JP) ................................. 2015-174473

(51) Int. Cl.
*H04B 1/38* (2015.01)
*H04B 1/3888* (2015.01)
(Continued)

(52) U.S. Cl.
CPC ............ *H04B 1/3888* (2013.01); *A45C 11/00* (2013.01); *H04M 1/72527* (2013.01);
(Continued)

(58) Field of Classification Search
CPC ........... H04M 1/72527; H04M 1/0254; H04M 1/026; H04M 1/0262; H04M 1/0274; H04B 1/3888
(Continued)

(56) References Cited

U.S. PATENT DOCUMENTS 6,626,362 B1 * 9/2003 Steiner ............... G06K 7/10881
235/462.45
6,710,576 B1 * 3/2004 Kaufman ............. H02J 7/0044
320/107
(Continued)

FOREIGN PATENT DOCUMENTS

JP 3041829 U 7/1997
JP 2001-057481 A 2/2001
(Continued)

OTHER PUBLICATIONS

Dog&Bone, "Backbone Wireless Charging Battery", Internet article obtained Apr. 18, 2017.*
(Continued)

*Primary Examiner* — Duc M Nguyen
(74) *Attorney, Agent, or Firm* — Global IP Counselors, LLP

(57) ABSTRACT

A cover set includes a first cover and a second cover. The first cover and the second cover have device fitting parts that have the same shape and size. A peripheral device is fitted in the device fitting parts. The first cover and the second cover have terminal fitting parts that have different shapes and sizes. A first mobile information terminal having a large size is fitted in the terminal fitting part of the first cover. Another mobile information terminal having a small size is fitted in the terminal fitting part of the second cover. This allows a user to select a mobile information terminal that is used together with the peripheral device as appropriate.

7 Claims, 14 Drawing Sheets

(51) Int. Cl.
*A45C 11/00* (2006.01)
*H04M 1/725* (2006.01)
*H04M 1/02* (2006.01)

(52) U.S. Cl.
CPC ....... *A45C 2011/002* (2013.01); *H04M 1/026* (2013.01); *H04M 1/0262* (2013.01); *H04M 1/0274* (2013.01)

(58) Field of Classification Search
USPC ...................................................... 455/575.8
See application file for complete search history.

(56) References Cited

U.S. PATENT DOCUMENTS

| | | | | |
|---|---|---|---|---|
| 2004/0042618 | A1* | 3/2004 | Ho | H04M 1/0262 |
| | | | | 379/428.01 |
| 2006/0141349 | A1* | 6/2006 | Ojanen | H01R 13/115 |
| | | | | 429/123 |
| 2008/0192410 | A1 | 8/2008 | Kumar | |
| 2012/0118772 | A1* | 5/2012 | Ellis-Brown | G06F 1/1628 |
| | | | | 206/320 |
| 2013/0013813 | A1 | 1/2013 | Lee | |
| 2013/0082963 | A1* | 4/2013 | Chu | G03B 17/08 |
| | | | | 345/173 |
| 2013/0109316 | A1* | 5/2013 | Lee | H04M 1/725 |
| | | | | 455/41.2 |
| 2014/0192493 | A1* | 7/2014 | Lerenthal | G06F 1/1635 |
| | | | | 361/752 |
| 2014/0313657 | A1 | 10/2014 | Kumar | |
| 2015/0028104 | A1 | 1/2015 | Ma et al. | |
| 2015/0097008 | A1 | 4/2015 | Adeyemi | |
| 2015/0295446 | A1* | 10/2015 | Fathollahi | H02J 7/0045 |
| | | | | 455/573 |
| 2015/0358439 | A1* | 12/2015 | Carnevali | H04M 1/0254 |
| | | | | 455/575.8 |
| 2016/0294429 | A1* | 10/2016 | LeBeau | H04B 1/3888 |
| 2017/0026498 | A1* | 1/2017 | Goldfain | A45C 11/182 |
| 2017/0070255 | A1* | 3/2017 | Suzuki | H04B 1/3888 |

FOREIGN PATENT DOCUMENTS

| | | |
|---|---|---|
| JP | 3896228 B2 | 3/2007 |
| JP | 2011-191817 A | 9/2011 |
| JP | 2014-96128 A | 5/2014 |
| WO | 2005/104655 A2 | 11/2005 |

OTHER PUBLICATIONS

Decision to Grant a Patent in the corresponding Japanese Patent Application No. 2015-174473 dated Jul. 25, 2016.
Office Action in the corresponding Japanese Patent Application No. 2015-174473 dated May 10, 2016.
"Phone Backbone wireless Charging Case", dated Mar. 14, 2015, pp. 1-29.

* cited by examiner

COVER SET

CROSS-REFERENCE TO RELATED APPLICATION

This application is a continuation-in-part application of U.S. patent application Ser. No. 15/253,589 filed on Aug. 31, 2016, which claims priority to Japanese Patent Application No. 2015-174473 filed on Sep. 4, 2015. The entire disclosures of Japanese Patent Application No. 2015-174473 and U.S. patent application Ser. No. 15/253,589 are hereby incorporated herein by reference.

BACKGROUND

Technical Field

The present invention relates to a cover set that is made up of a plurality of covers. More specifically, the present invention relates to a cover set that is made up of covers having different forms.

Related Art

Peripheral devices that are used together with mobile information terminals and expand functions of the mobile information terminals have been developed. Japanese Patent No. 3896228 B discloses, as an example of such peripheral devices, a bar-code reader that is electrically connected to a mobile information terminal and gives the mobile information terminal a new function of reading a bar-code.

The bar-code reader has a reading window and is housed in a fitting part provided in a cover of the mobile information terminal so that the reading window is exposed. Use of such a cover makes it possible to handle the mobile information terminal and the bar-code reader as a single unit, thereby achieving good handling performance and allowing a user to feel as if the mobile information terminal was a terminal dedicated for bar-code reading.

However, the aforementioned cover can be used only for a specific kind of mobile information terminal and cannot be used, for example, for other kinds of mobile information terminals that are different in terms of shape or size or both shape and size.

In recent years, technical development on the mobile information terminal has been remarkable, and new models have been developed one after another in a short period of time. In the market, a sales method in which covers for the new models are also sold at the same timings as release of the new models has been established. This offers a user a wide variety of options concerning a mobile information terminal and a cover thereof.

However, as a matter of course, a commercially available cover does not have a feature corresponding to the aforementioned fitting part. Accordingly, in order to handle a newly selected mobile information terminal and a peripheral device as a single unit as described above, it is necessary for a user to create a feature corresponding to the fitting part by processing a commercially available cover or to separately prepare a dedicated cover.

Processing a cover or separately preparing a dedicated cover as described above invites an increase in economic burden on both a user and a cover provider. Such an increase in economic burden can be a cause that makes the user give up purchasing a new model.

SUMMARY

The present invention was accomplished in view of the above problems, and an objective of the present invention is to provide a cover set that makes it possible to select a mobile information terminal that is used integrally with a peripheral device.

In order to accomplish the above objective, a cover set according to a first aspect of the present invention includes: a first cover; and a second cover that has a form that is different from the first cover, the first cover and the second cover each having: a tray-shaped terminal fitting part in which any of a plurality of mobile information terminals that are different from each other in terms of shape or size or both shape and size is to be fitted; and a recess-shaped device fitting part provided in a bottom part of the terminal fitting part and in which a peripheral device that is electrically connectable to each of the plurality of mobile information terminals via a connector is to be fitted, the terminal fitting part of the first cover and the terminal fitting part of the second cover being configured to be compatible with the respective different mobile information terminals.

In the cover set according to a second aspect of the present invention, the first cover and the second cover each have a connector fitting part in which the connector is to be fitted.

In the cover set according to a third aspect of the present invention, positions of the terminal fitting part and the device fitting part relative to the connector fitting part are common to the first cover and the second cover.

In the cover set according to a fourth aspect of the present invention, the device fitting part of the first cover and the device fitting part of the second cover each include an inner wall part that is made of elastomer and makes close contact with a peripheral surface of the peripheral device, and a bottom part that is made of plastic and covers the inner wall part and a back surface of the peripheral device.

According to the cover set of the present invention, the first cover and the second cover, each of which has a device fitting part in which a peripheral device is to be fitted, have respective terminal fitting parts that are compatible with different mobile information terminals. This allows a user to select a desired mobile information terminal and to select a cover having a terminal fitting part that is compatible with the selected mobile information terminal. That is, a user can select a mobile information terminal that is used integrally with the peripheral device.

DETAILED DESCRIPTION OF EMBODIMENTS

Figure 1:
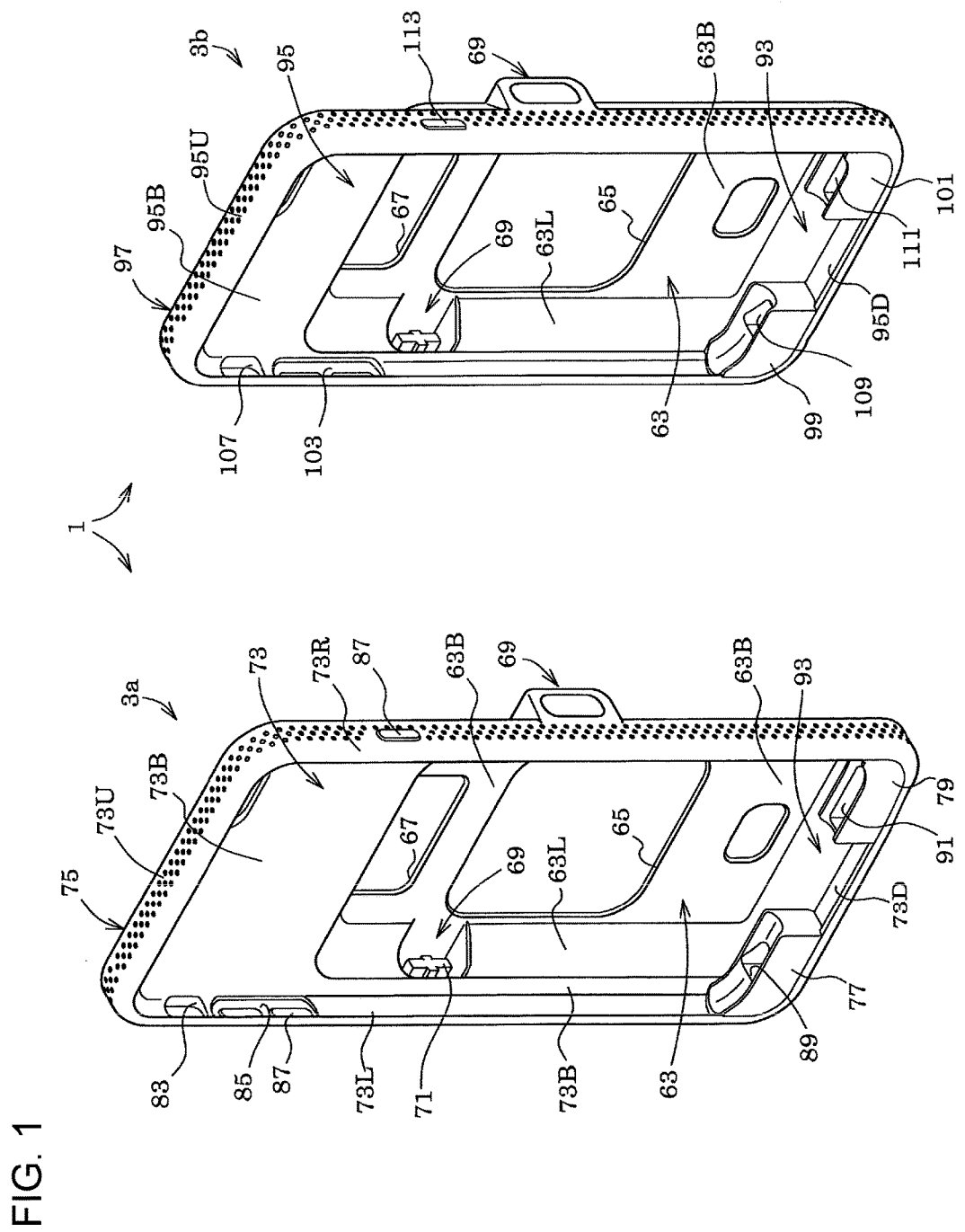
FIG. 1 is a perspective view of a cover set according to an embodiment.

Embodiments of the present invention are described below with reference to the drawings. Identical reference numerals in the drawings indicate identical or similar elements.

As illustrated in FIG. 1, a cover set 1 of the present embodiment includes a first cover 3a and a second cover 3b. The first cover 3a is attached to a first mobile information terminal 5a (hereinafter referred to as a "first terminal 5a" (FIGS. 2A and 2B) and a peripheral device 7 (FIGS. 3A and 3B) that are electrically connected to each other.

Figure 2A:
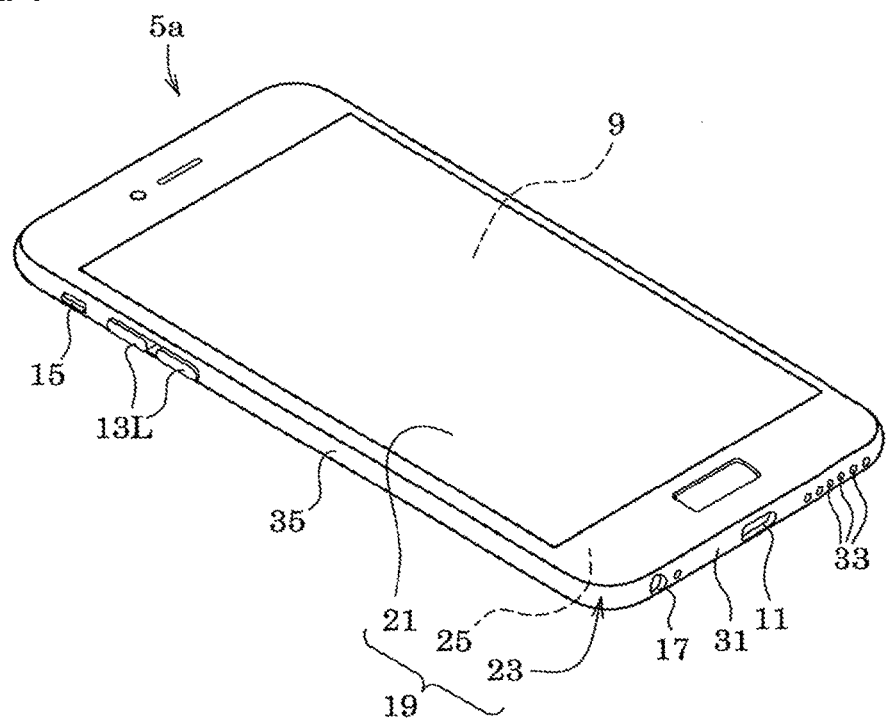
FIG. 2A is a perspective view of a mobile information terminal viewed from a front surface side.
Figure 2B:
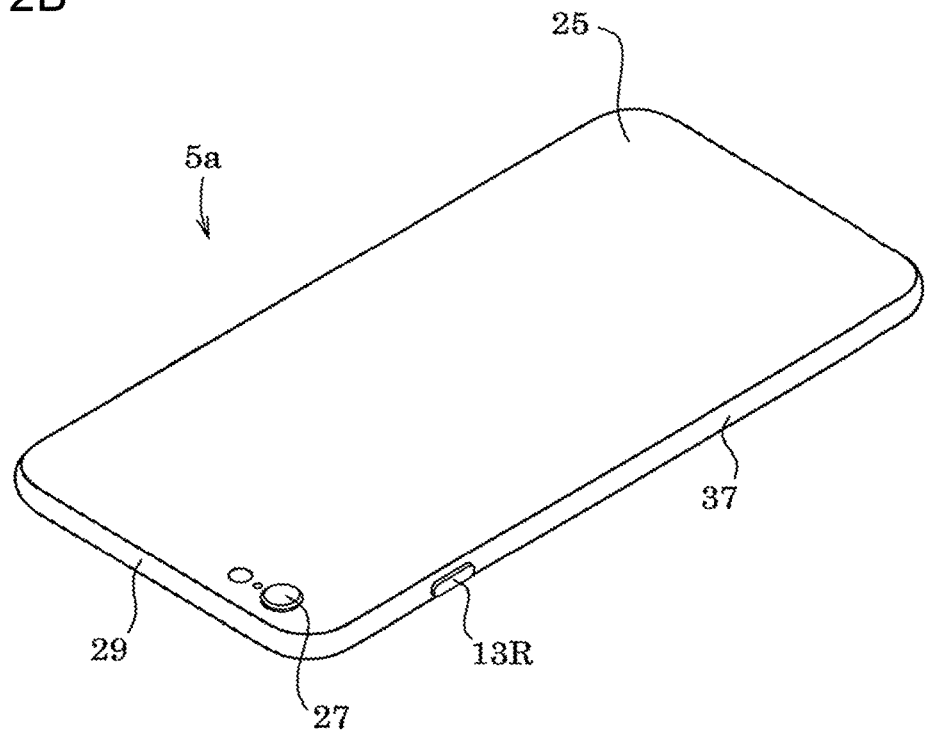
FIG. 2B is a perspective view of the mobile information terminal viewed from a back surface side.

As illustrated in FIGS. 2A and 2B, the first terminal 5a is a smart device represented by a tablet terminal and a smartphone, and is implemented by a computer including a touch panel 9, a female connector 11, a plurality of push switches 13L and 13R, a slide switch 15, a jack 17 to which a plug of an earphone microphone is connected, an imaging device (not illustrated), a microphone (not illustrated), and a speaker (not illustrated). This computer achieves a predetermined function by causing a central processing unit (not illustrated) to execute a program stored in a memory (not illustrated), and communicates with another device or a network terminal via a wireless communication module (not illustrated).

A housing 19 of the first terminal 5a includes a cover plate 21, a back surface 25 (hereinafter also referred to as a "back surface 25 of the first terminal 5a"), and a peripheral surface 23 (hereinafter also referred to as a "peripheral surface 23 of the first terminal 5a"). The cover plate 21 has a rectangular shape having rounded corners. The cover plate 21 is transparent and is disposed on a display screen of the touch panel 9. The back surface 25 of the housing 19 has a rectangular shape having rounded corners. The back surface 25 is provided, on its upper portion, with a camera lens 27 for an imaging device. The peripheral surface 23 extends from a periphery of the back surface 25 to a periphery of the cover plate 21. A hole 33 leading to the microphone, an opening for the female connector 11 (hereinafter also referred to as a "socket for the female connector 11"), and an opening for the jack 17 are formed in one short side 31 of the peripheral surface 23 (hereinafter also referred to as a "lower surface 31 of the first terminal 5a"). Note that, the other short side 29 of the peripheral surface 23 is also hereinafter referred to as an "upper surface 29 of the first terminal 5a". Key tops of the two push switches 13L and the slide switch 15 are disposed in a protruding manner on one long side 35 of the peripheral surface 23 (a left surface 35 of the first terminal 5a). A key top of the push switch 13R is disposed in a protruding manner on the other long side 37 of the peripheral surface 23 (a right surface 37 of the first terminal 5a).

Figure 3A:
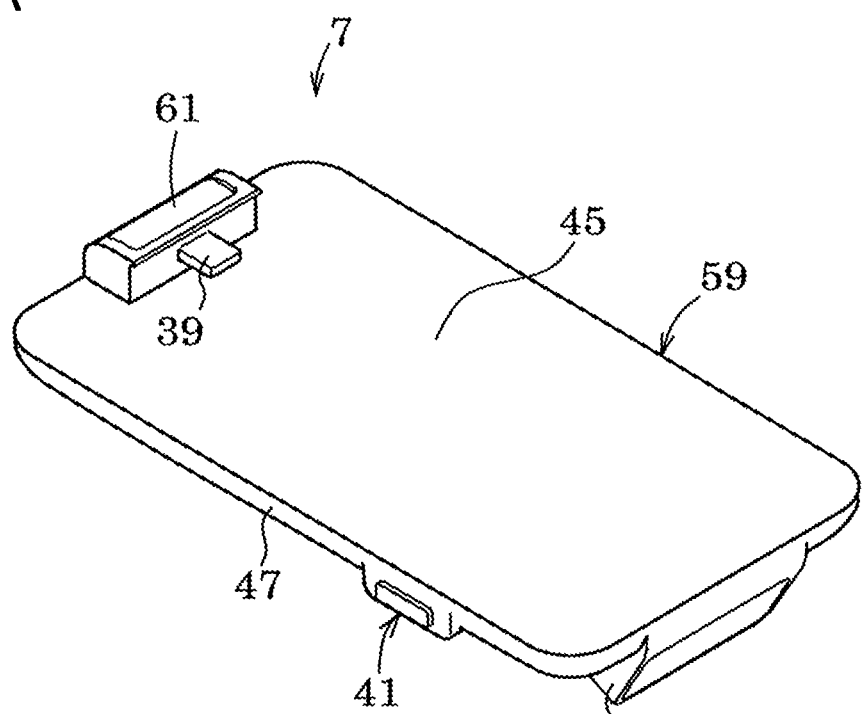
FIG. 3A is a perspective view of a peripheral device viewed from a front surface side.
Figure 4A:
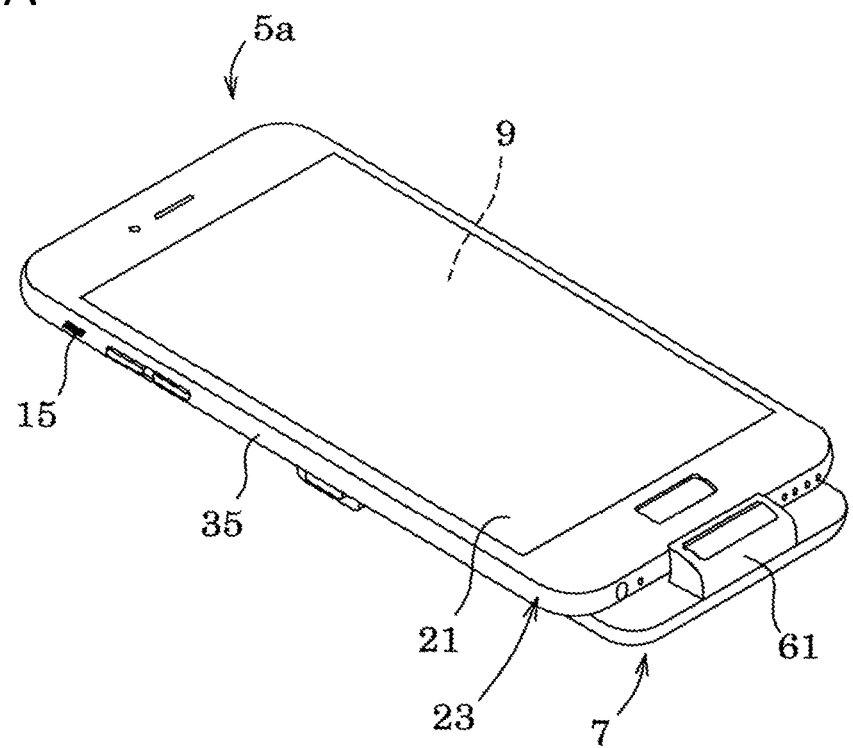
FIG. 4A is a perspective view, as viewed from a front surface side, of an embodiment in which the mobile information terminal and the peripheral device are connected to each other.
Figure 4B:
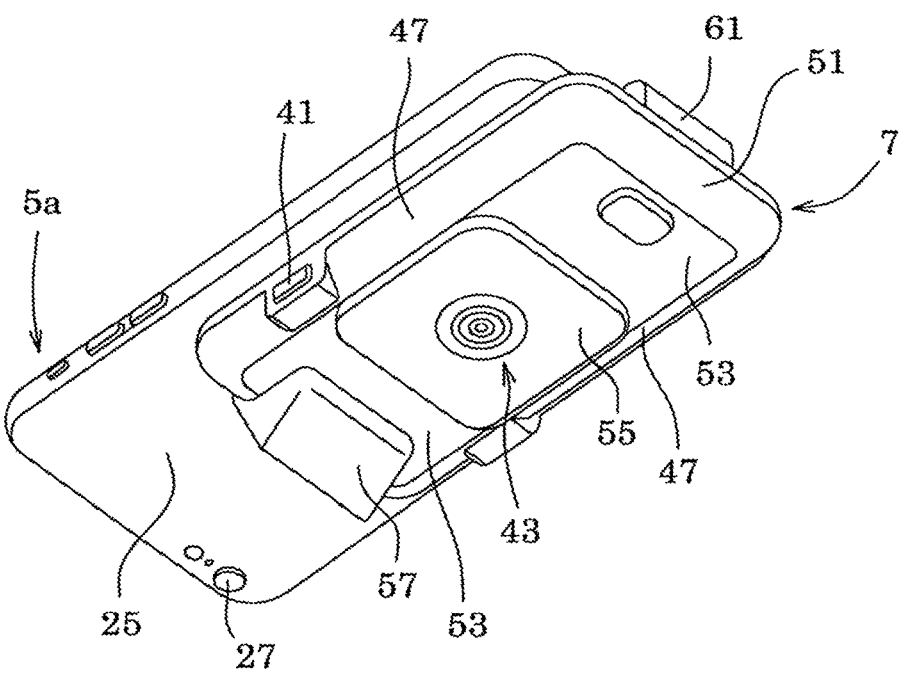
FIG. 4B is a perspective view, as viewed from a back surface side, of an embodiment in which the mobile information terminal and the peripheral device are connected to each other.
Figure 5A:
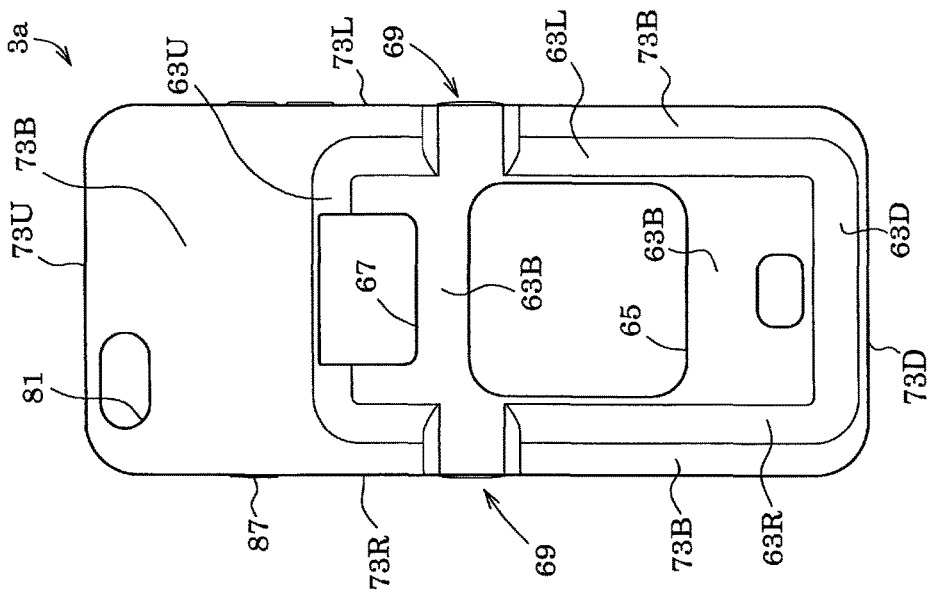
FIG. 5A is a front view of a first cover.
Figure 5B:
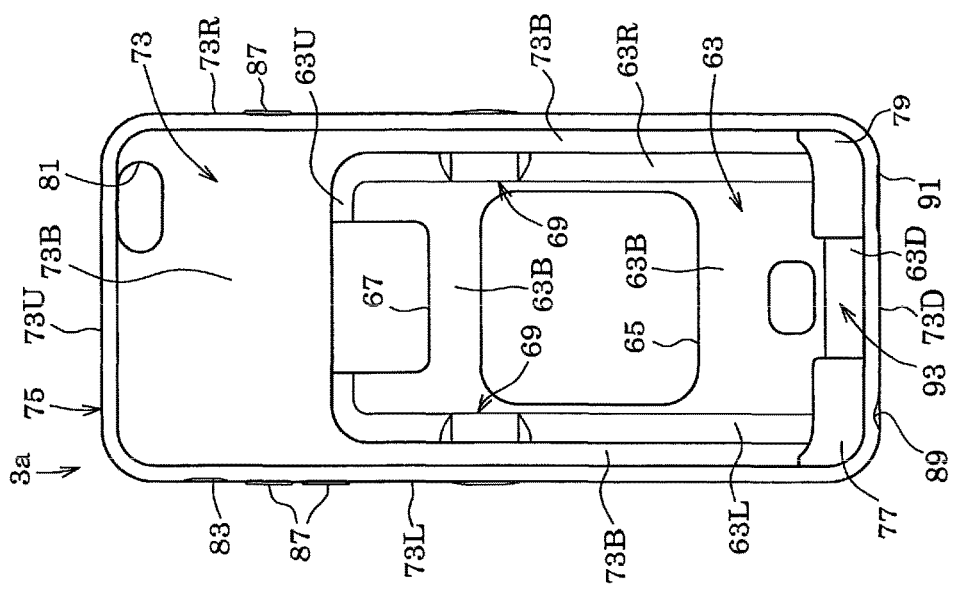
FIG. 5B is a back view of the first cover.
Figure 6A:
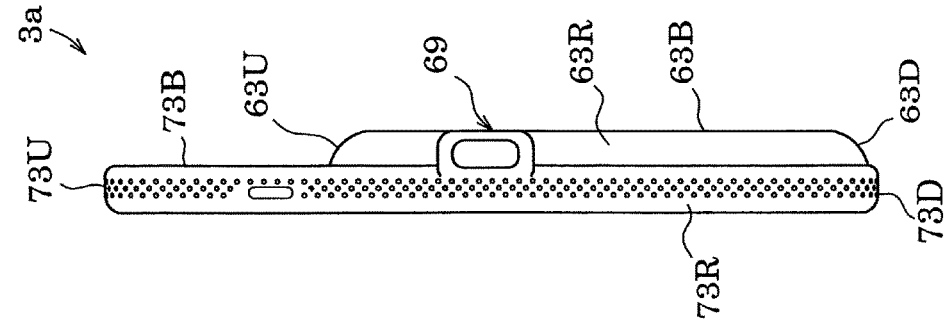
FIG. 6A is a left side view of the first cover.
Figure 6B:
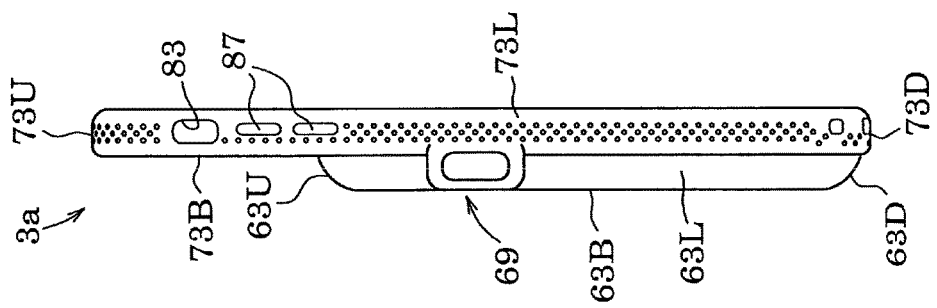
FIG. 6B is a right side view of the first cover.
Figure 7A:
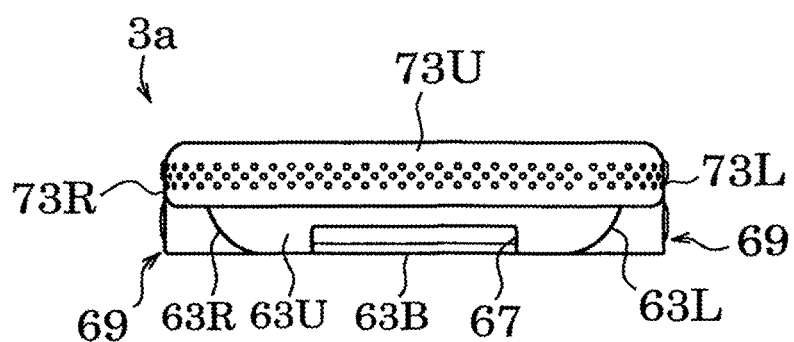
FIG. 7A is a top view of the first cover.
Figure 7B:
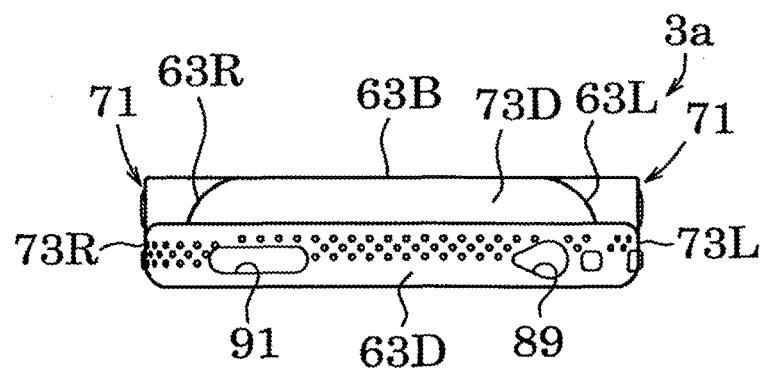
FIG. 7B is a bottom view of the first cover.

A male connector 39 (FIG. 3A) of the peripheral device 7 is connected to the socket of the female connector 11, and thus the peripheral device 7 is disposed on the back surface 25 of the first terminal 5a as illustrated in FIGS. 4A and 4B.

Figure 3B:
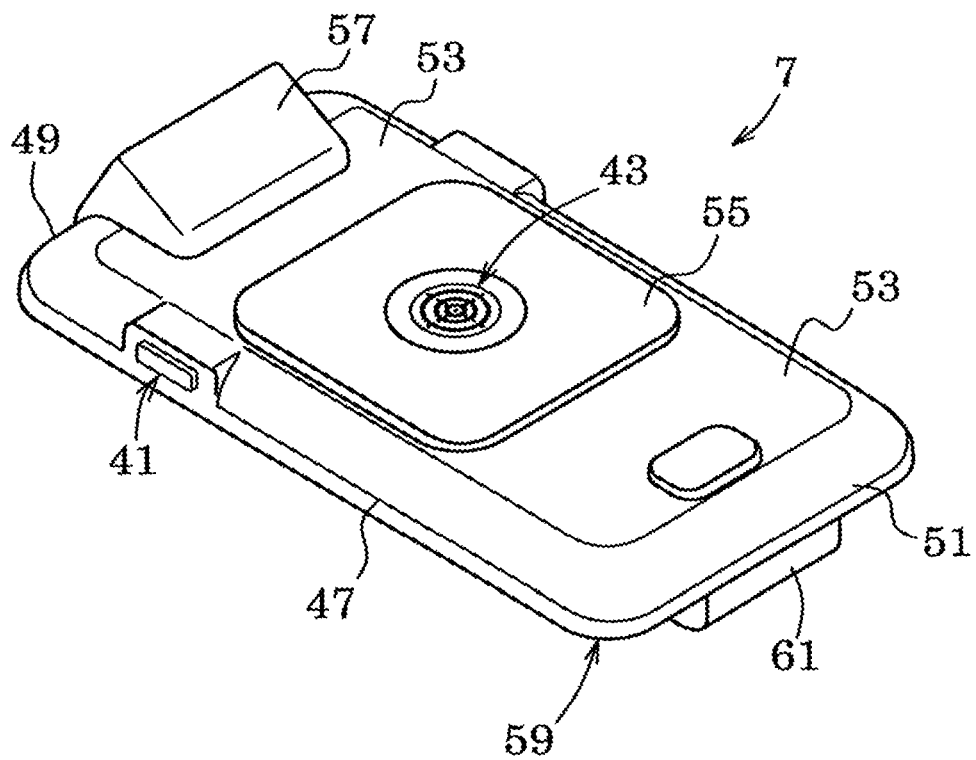
FIG. 3B is a perspective view of the peripheral device viewed from a back surface side.

The peripheral device 7 illustrated in FIGS. 3A and 3B includes a bar-code reader module (not illustrated) that transmits detected bar-code information to the first terminal 5a via the male connector 39. The bar-code reader module includes a light-emitting element, a light-receiving element that receives light reflected from a bar-code, a microcomputer that analyzes the bar-code information on the basis of an output signal supplied from the light-receiving element and transmits the analyzed bar-code information to the first terminal 5a, and two push switches connected to the microcomputer.

The peripheral device 7 further includes a power source module (not illustrated) that feeds electric power to the bar-code reader module. The power source module includes a battery that feeds electric power to the bar-code reader module, a plurality of annular electrodes 43 for receiving electric power from an external power source, and a charge control IC that feeds the electric power from the annular electrodes 43 to the battery while controlling the electric power. The electric power of the battery is also fed to the first terminal 5a via the male connector 39. Note that, the plurality of annular electrodes 43 are disposed in a concentric pattern.

The bar-code reader module, the battery, and the charge control IC are housed in a housing 59 of the peripheral device 7. The housing 59 has a substantially rectangular front surface 45 that extends along the back surface 25 of the first terminal 5a when the housing 59 is connected to the first terminal 5a. The substantially rectangular front surface 45 has a smaller width than the width of the back surface 25 of the first terminal 5a and a shorter length than the length of the back surface 25 of the first terminal 5a. The front surface 45 is disposed on a lower side of the back surface 25 of the first terminal 5a.

Furthermore, the housing 59 has a pair of side surfaces 47 (hereinafter also referred to as "side surfaces 47 of the peripheral device 7"), an upper surface 49 (hereinafter also referred to as an "upper surface 49 of the peripheral device 7"), and a lower surface 51 (hereinafter also referred to as a "lower surface 51 of the peripheral device 7") that extend from the periphery of the front surface 45 toward a side opposite to the first terminal 5a and are inclined inwardly. Each of the side surfaces 47 has a switch part 41 (hereinafter also referred to as a "switch part 41 of the peripheral device 7") including a push switch. The side surfaces 47, the upper surface 49, and the lower surface 51 of the peripheral device 7 constitute a peripheral surface of the peripheral device 7.

Furthermore, the housing 59 has a substantially rectangular back surface 53 (hereinafter also referred to as a "back surface 53 of the peripheral device 7") that extends inwardly from ends of the extended side surfaces 47, upper surface 49, and lower surface 51. A square holding base 55 that holds the annular electrodes 43 of the power source module in an exposed state is provided in a bulging manner at the center of the substantially rectangular back surface 53. A reading window part 57 for the light-emitting element and the light-receiving element of the bar-code reader module is provided in a protruding manner in a region from an upper portion of the back surface 53 to the upper surface 49.

Furthermore, the housing 59 has a connector part 61 (hereinafter also referred to as a "connector part 61 of the peripheral device 7") having a shape of a rectangular parallelepiped that protrudes from a lower side of the front surface 45 toward the lower surface 31 of the first terminal 5*a*. The male connector 39 protrudes from the connector part 61 towards the socket of the female connector 11 of the first terminal 5*a*.

The first cover 3*a* illustrated in FIG. 1, FIGS. 5A, 5B, FIGS. 6A, 6B and FIGS. 7A, 7B is attached to the first terminal 5*a* and the peripheral device 7. The first cover 3*a* includes a tray-shaped terminal fitting part 73, a recess-shaped device fitting part 63 provided in a bottom of the terminal fitting part 73, and a connector fitting part 93 provided in a frame part of the terminal fitting part 73. The first cover 3*a* is made of elastomer represented by a silicon resin, and is molded such that the thickness of parts constituting the first cover 3*a* is small.

The device fitting part 63 has a bottom part 63B, side parts 63L and 63R, an upper part 63U, and a lower part 63D. Note that, the bottom part 63B is also referred to as a second bottom part. The side parts 63L and 63R, the upper part 63U, and the lower part 63D are collectively referred to as a peripheral wall part.

The bottom part 63B (the second bottom part) is formed so as to be compatible with the back surface 53 (FIGS. 4A and 4B) of the peripheral device 7 connected to the first terminal 5*a*. Specifically, the bottom part 63B has a rectangular shape that has substantially the same size as the back surface 53 of the peripheral device 7. A hole 65 that has the same size (the same shape) as an outer edge of the holding base 55 of the peripheral device 7 is formed at a central part of the bottom part 63B. Furthermore, a hole 67 in which the reading window part 57 can be inserted is formed at a portion, corresponding to the reading window part 57 of the peripheral device 7, from an upper portion of the bottom part 63B to the upper part 63U.

The side parts 63L and 63R are formed so as to be compatible with the side surfaces 47 of the peripheral device 7. Specifically, the side parts 63L and 63R extend from left and right edges of an outer peripheral edge of the bottom part 63B so as to be curved in the substantially same manner as the side surfaces 47 of the peripheral device 7. Switch housing parts 69 that bulge outwardly are provided in the side parts 63L and 63R at portions corresponding to the switch parts 41 provided on the side surfaces 47 of the peripheral device 7. A cross-shaped rib 71 (FIG. 1) for pressing down a key top in corresponding one of the switch parts 41 of the peripheral device 7 is provided in each of the switch housing parts 69.

The upper part 63U and the lower part 63D are formed so as to be compatible with the upper surface 49 and the lower surface 51 of the peripheral device 7, respectively. Specifically, the upper part 63U and the lower part 63D extend from upper and lower edges of the outer peripheral edge of the bottom part 63B so as to be curved in the substantially same manner as the upper surface 49 and the lower surface 51 of the peripheral device 7, respectively.

As described above, the peripheral wall part (the side parts 63L and 63R, the upper part 63U, and the lower part 63D) of the first cover 3*a* extends from the outer peripheral edge of the second bottom part (the bottom part 63B) so as to surround the peripheral surface of the peripheral device 7 fitted into the device fitting part 63.

When the peripheral device 7 is fitted into the device fitting part 63, the bottom part 63B makes close contact with the back surface 53 of the peripheral device 7. Furthermore, the side parts 63L and 63R make close contact with the side surfaces 47 of the peripheral device 7. Furthermore, the upper part 63U makes close contact with the upper surface 49 of the peripheral device 7. Furthermore, the lower part 63D makes close contact with the lower surface 51 of the peripheral device 7. Furthermore, the holding base 55 is fitted into the hole 65, and thus the annular electrodes 43 are exposed to an outside of the bottom part 63B. Furthermore, the reading window part 57 protrudes to the outside of the bottom part 63B through the hole 67. Furthermore, the switch parts 41 are housed in the switch housing parts 69.

The first terminal 5*a* is disposed on the front surface 45 side of the peripheral device 7. The first terminal 5*a* is fitted into the terminal fitting part 73 of the first cover 3*a*. The terminal fitting part 73 includes the bottom part 73B and the frame part. Note that, the bottom part 73B is hereinafter also referred to as a first bottom part.

The bottom part 73B (the first bottom part) is formed so as to be compatible with the back surface 25 (FIGS. 4A and 4B) of the first terminal 5*a* connected to the peripheral device 7. Specifically, the bottom part 73B has the same shape as an exposed region of the back surface 25 of the first terminal 5*a* connected to the peripheral device 7. A hole 81 for exposing the camera lens 27 is formed in the bottom part 73B at a portion corresponding to the camera lens 27 of the first terminal 5*a*.

The frame part is made up of a surrounding part 75, a left spacer part 77, and a right spacer part 79.

The surrounding part 75 has a rectangular shape so as to surround the first terminal 5*a* and is made up of a left side part 73L, a right side part 73R, an upper part 73U, and a lower part 73D. The left side part 73L, the right side part 73R, and the upper part 73U extend in a direction perpendicular to the bottom part 73B from left, right, and upper edges of the outer peripheral edge of the bottom part 73B, respectively. The lower part 73D extends from the lower part 63D of the device fitting part 63. The extended length of the left side part 73L, the right side part 73R, the upper part 73U, and the lower part 73D are slightly longer than the thickness of the first terminal 5*a* and ends thereof have a hook shape that is curved inwardly.

A hole 83 is formed in the left side part 73L of the surrounding part 75 at a portion corresponding to a key top of the slide switch 15 of the first terminal 5*a*. Furthermore, grooves 85 that are recessed toward the outside are provided in the left side part 73L and the right side part 73R of the surrounding part 75 at portions corresponding to the push switches 13L and 13R of the first terminal 5*a*. Button parts 87 for pressing down the push switches 13L and 13R are provided in the respective grooves 85.

The left spacer part 77 and the right spacer part 79 are provided at inner sides of left and right corners on the lower part 73D side among corners of the surrounding part 75. The left spacer part 77 and the right spacer part 79 are spaced away from each other such that the connector part 61 of the peripheral device 7 is fitted therebetween. A hole 89 that passes through the lower part 73D and the left spacer part 77 is formed. Furthermore, a hole 91 that passes through the lower part 73D and the right spacer part 79 is formed.

When the first terminal 5*a* is fitted into the terminal fitting part 73, the left side part 73L, the right side part 73R, the upper part 73U, the left spacer part 77, and the right spacer part 79 make close contact with the peripheral surface 23 of the first terminal 5*a*. The bottom part 73B makes close contact with the exposed portion of the back surface 25 of the first terminal 5*a*. The camera lens 27 of the first terminal 5*a* fits into the hole 81. The slide switch of the first terminal 5*a* is exposed through the hole 83. The button parts 87 make contact with the push switches 13L and 13R, respectively. The jack 17 provided in the lower surface 31 of the first terminal 5*a* is exposed through the hole 89. The hole 33 for microphone provided in the lower surface 31 of the first terminal 5*a* is exposed through the hole 91.

Furthermore, the connector part 61 of the peripheral device 7 connected to the first terminal 5*a* is surrounded by the left spacer part 77, the right spacer part 79, and the lower part 73D of the surrounding part 75, and is supported by these members. In this way, the connector fitting part 93 in which the connector part 61 is to be fitted is formed in an inside of the first cover 3*a* by the left spacer part 77, the right spacer part 79, and the lower part 73D.

Figure 8A:
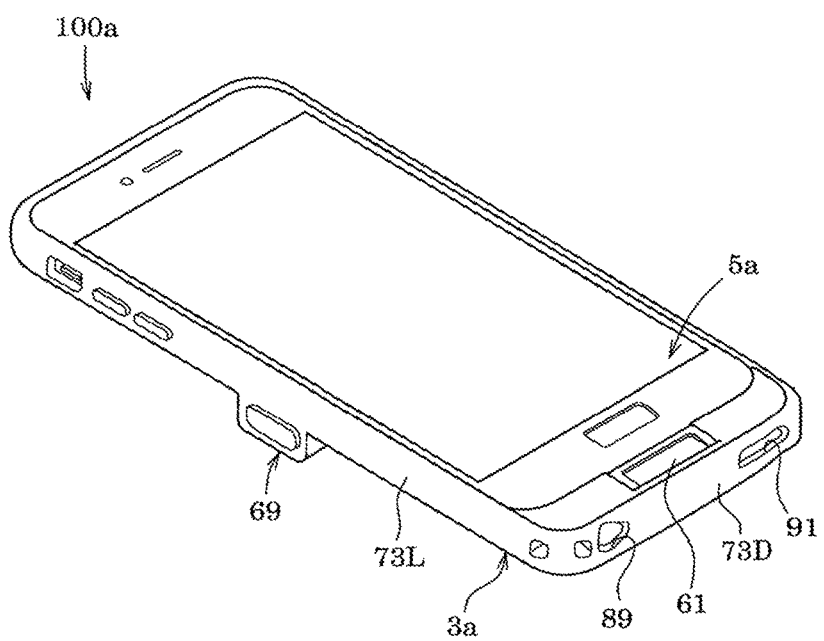
FIG. 8A is a perspective view of an integral terminal.

By attaching the first cover 3*a* to the peripheral device 7 connected to the first terminal 5*a*, an integral terminal 100*a* illustrated in FIG. 8A can be formed such that the first terminal 5*a* and the peripheral device 7 can be handled as a single unit. Such an integral terminal 100*a* makes it possible to prevent a user from losing the peripheral device 7 or from forgetting to carry the peripheral device 7. Furthermore, a user can read a bar-code while holding the integral terminal 100*a* with one hand and operate the touch panel 9 with the other hand. That is, the integral terminal 100*a* is excellent in handling performance, and a user can use the integral terminal 100*a* as if the integral terminal 100*a* was a terminal dedicated for bar-code reading.

Furthermore, the annular electrodes 43 of the peripheral device 7 are exposed to an outside of the first cover 3*a*. This is convenient because the integral terminal 100*a* can be charged without detaching the first cover 3*a*.

Figure 8B:
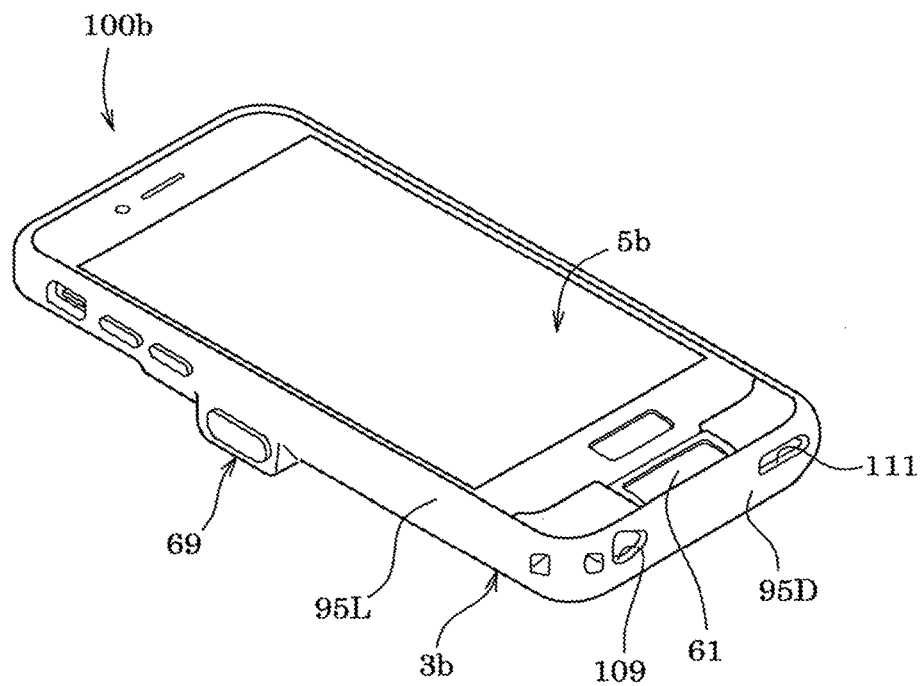
FIG. 8B is a perspective view of an integral terminal.
Figure 9A:
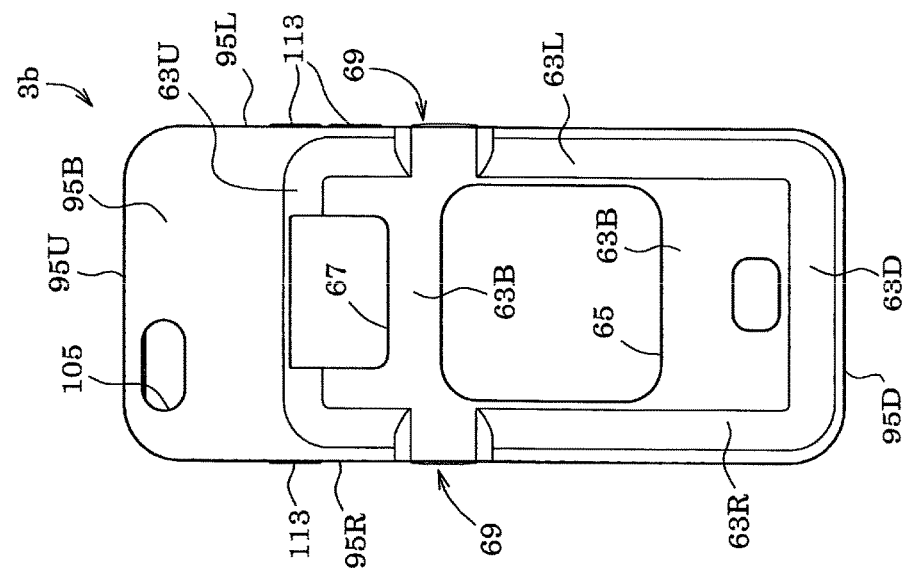
FIG. 9A is a front view of a second cover.
Figure 9B:
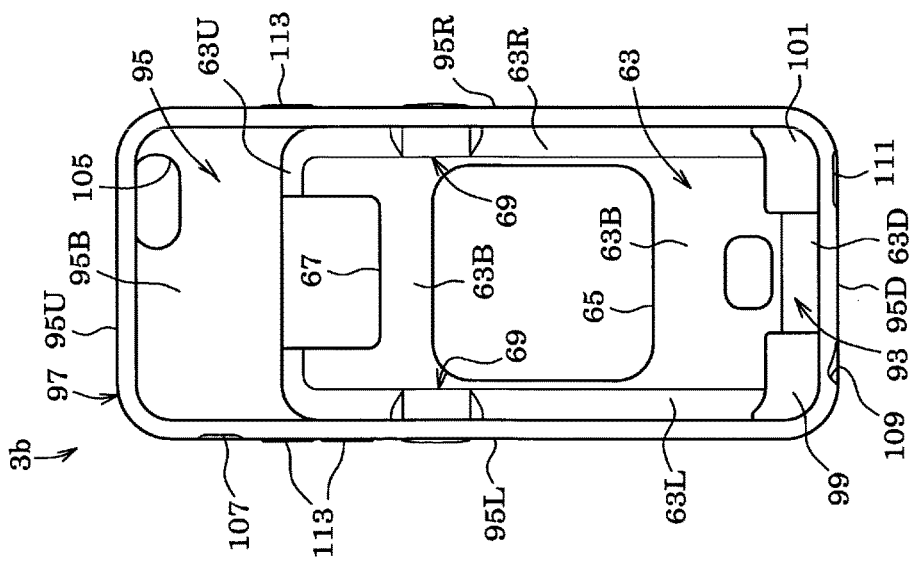
FIG. 9B is a back view of the second cover.
Figure 10A:
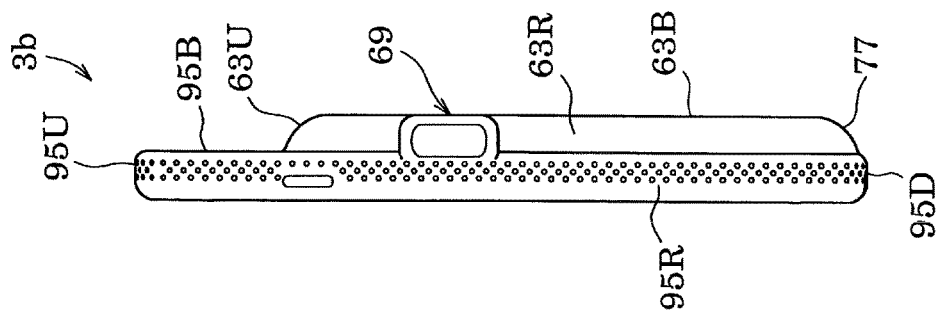
FIG. 10A is a left side view of the second cover.
Figure 10B:
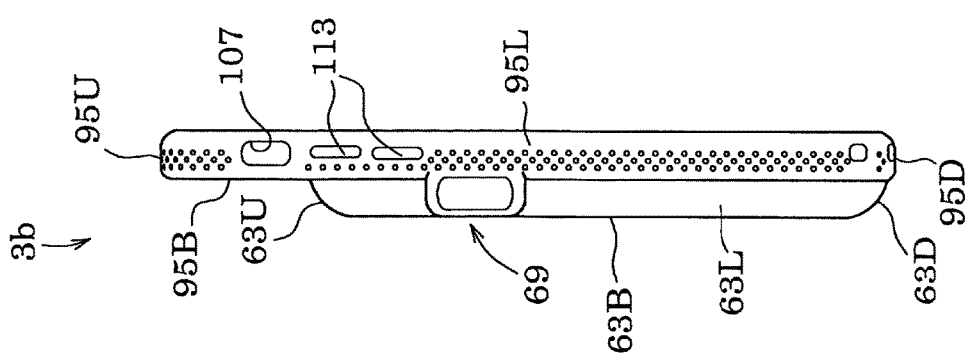
FIG. 10B is a right side view of the second cover.
Figure 11A:
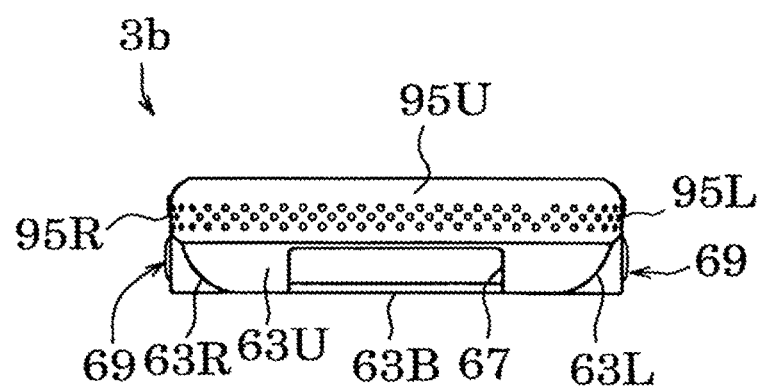
FIG. 11A is a top view of the second cover.
Figure 11B:
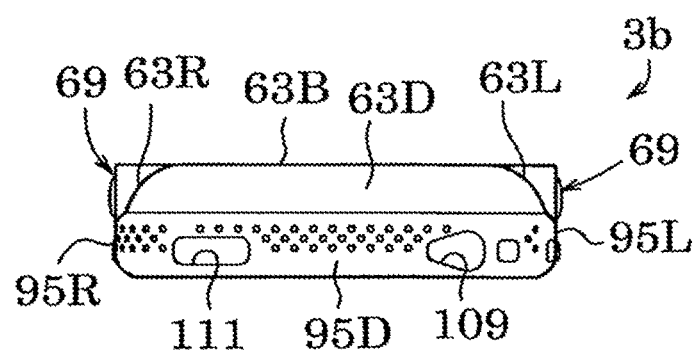
FIG. 11B is a bottom view of the second cover.
Figure 12A:
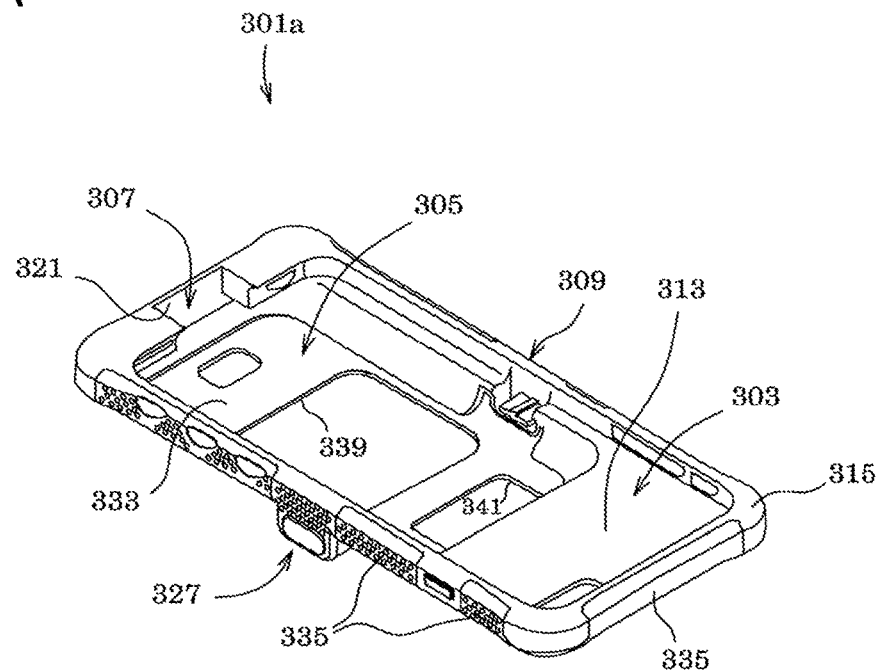
FIG. 12A is a perspective view, as viewed from a front surface side, of a variation of the first cover.
Figure 12B:
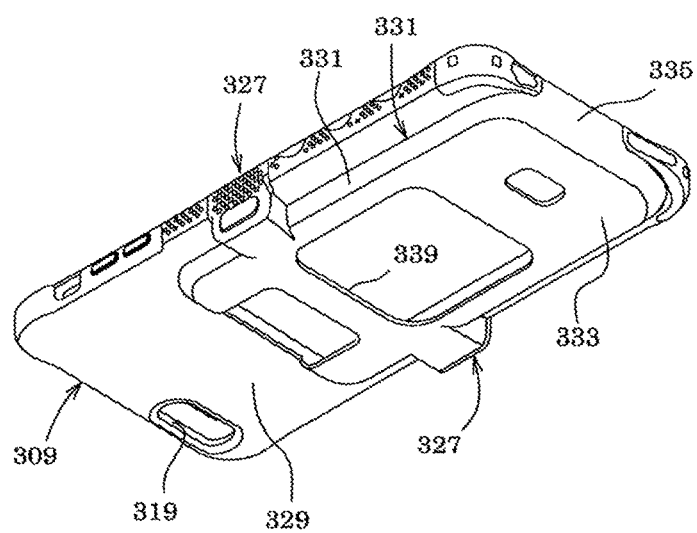
FIG. 12B is a perspective view, as viewed from a back surface side, of a variation of the first cover.
Figure 13:
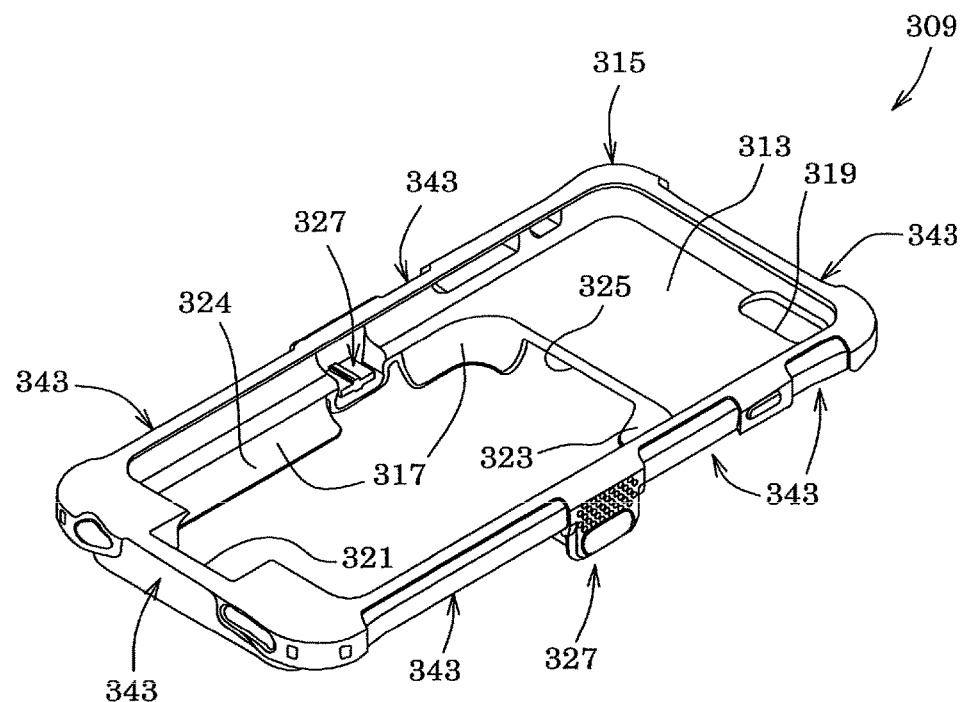
FIG. 13 is an exploded perspective view, as viewed from a front surface side, of a cover according to the variation.
Figure 13:
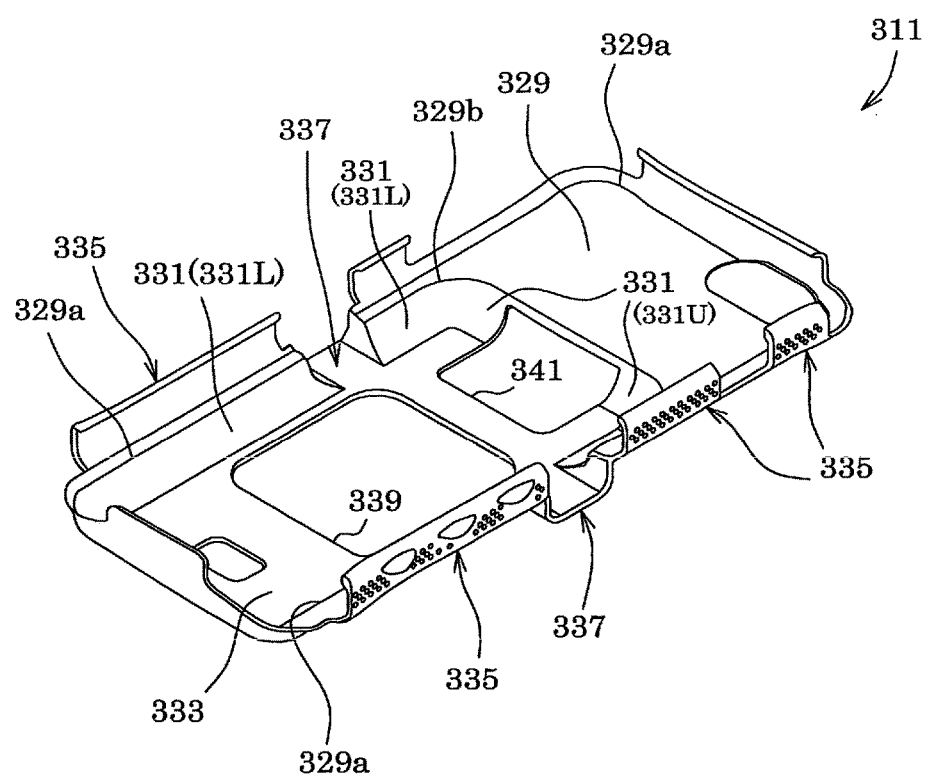
Figure 14:
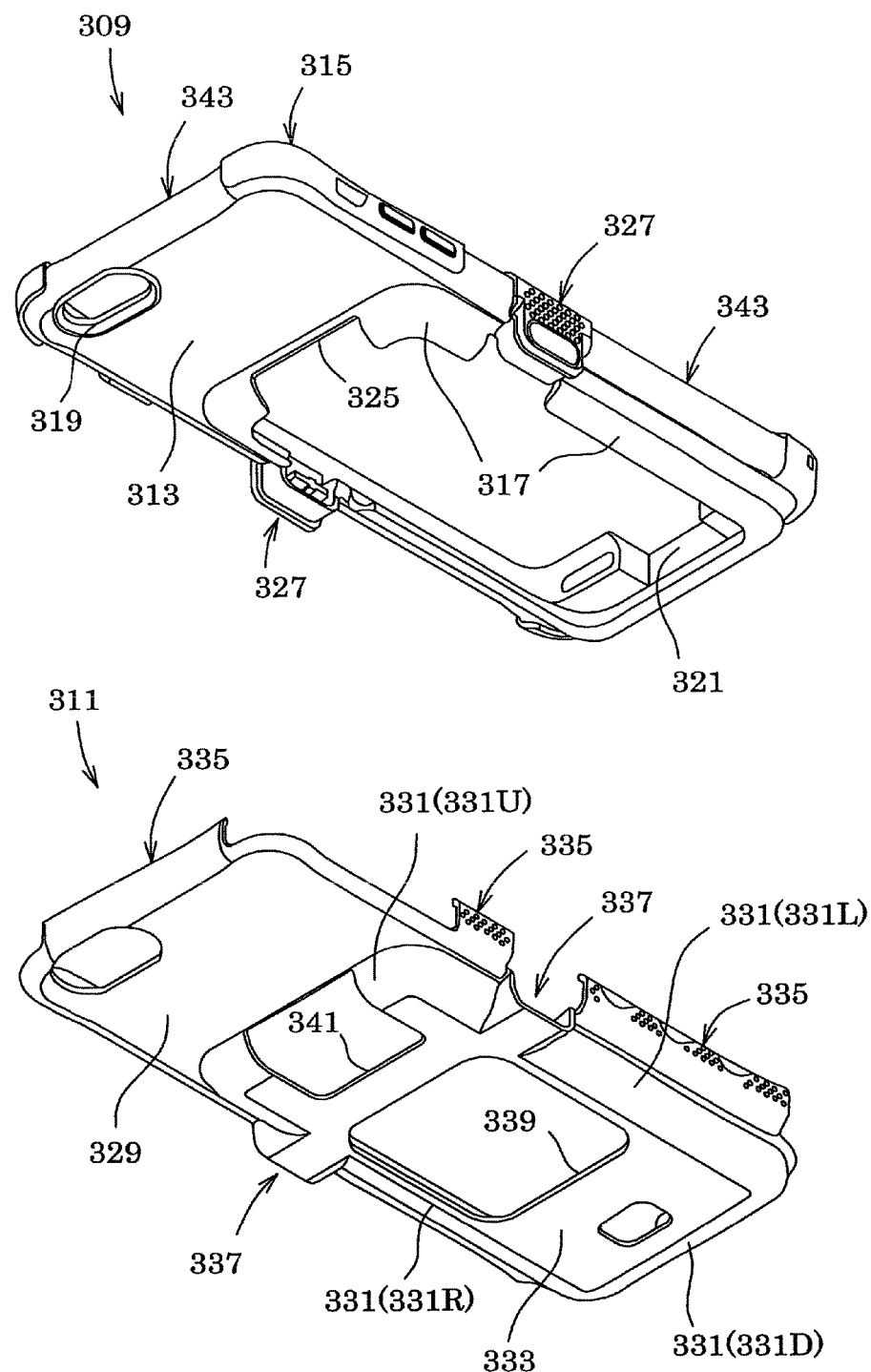
FIG. 14 is an exploded perspective view, as viewed from a back surface side, of a cover according to the variation.

The cover set 1 according to the present embodiment includes the second cover 3*b* in addition to the first cover 3*a*. The second cover 3*b* is attached to a second mobile information terminal 5*b* (hereinafter referred to as a "second terminal 5*b*") and the peripheral device 7. This forms an integral terminal 100*b* in which the second terminal 5*b*, the peripheral device 7, and the second cover 3*b* are integrated, as illustrated in FIG. 8B.

The second terminal 5*b* is a smart device having a smaller size than the size of the first terminal 5*a* and is also different from the first terminal 5*a* in terms of computer performance such as the processing speed of a central processing unit and the capacity of a memory. A positional relationship among various switches, a socket of a connector, a jack, an opening for microphone, and a camera lens in the second terminal 5*b* is identical to that in the first terminal 5*a*.

As illustrated in FIG. 1, FIGS. 9A, 9B, FIGS. 10A, 10B and FIGS. 11A, 11B, the second cover 3*b* includes a tray-shaped terminal fitting part 95, a recess-shaped device fitting part 63 provided in a bottom of the terminal fitting part 95, and a connector fitting part 93 provided in a frame part of the terminal fitting part 95. Parts that constitute the device fitting part 63 are identical to those of the first cover 3*a* and are given identical reference numerals, and description thereof is omitted.

The terminal fitting part 95 of the second cover 3*b* is made up of a first bottom part (bottom part 95B) and a frame part (a surrounding part 97, a left spacer part 99, and a right spacer part 101), as in the case of the terminal fitting part 73 of the first cover 3*a*.

The bottom part 95B is formed so as to be compatible with a back surface 25 of the second terminal 5*b* connected to the peripheral device 7. The surrounding part 97 is formed so as to surround a peripheral surface 23 of the second terminal 5*b* and is made up of a left side part 95L, a right side part 95R, an upper part 95U, and a lower part 95D. The left side part 95L extends from a left edge of the bottom part 95B and from a side part 63L of the terminal fitting part 95. The right side part 95R extends from a right edge of the bottom part 95B and from a side part 63R of the terminal fitting part 95. The upper part 95U extends from an upper edge of the bottom part 95B. The lower part 95D extends from a lower part 63D of the terminal fitting part 95.

A left spacer part 99 and a right spacer part 101 are provided on an inner side of left and right corners on the lower part 95D side among corners of the surrounding part 97 so as to sandwich the connector part 61. The left spacer part 99, the right spacer part 101, and the lower part 95D constitute the connector fitting part 93 in which the connector part 61 is to be fitted.

As in the case of the first cover 3*a*, the second cover 3*b* has grooves 103 and button parts 113 corresponding to push switches of the second terminal 5*b*, and holes 105, 107, 109, and 111 corresponding to a camera lens, a slide switch, a jack, and an opening for microphone of the second terminal 5*b*. Note that, a positional relationship of the terminal fitting part 95 and the device fitting part 63 relative to the connector fitting part 93 is identical to that of the terminal fitting part 73 and the device fitting part 63 relative to the connector fitting part 93 in the first cover 3*a*.

According to the cover set 1 of the present embodiment, a user can select a desired one of the first terminal 5*a* and the second terminal 5*b*, and select the first cover 3*a* having the terminal fitting part 73 compatible with the selected mobile information terminal 5*a* or the second cover 3*b* having the terminal fitting part 95 compatible with the selected mobile information terminal 5*b*. That is, a user can select one of the first terminal 5*a* and the second terminal 5*b* that is used integrally with the peripheral device 7. Furthermore, the shape and the size of the device fitting part 63 are common to the first cover 3*a* and the second cover 3*b*. This allows a provider of the cover set 1 to reduce costs of development.

The cover set 1 of the present embodiment is not limited to the aforementioned configuration including the first cover 3*a* and the second cover 3*b* only, and may further include a third cover having a terminal fitting part that is formed so as to be compatible with another mobile information terminal that is different in terms of shape or size or both shape and size.

The peripheral device 7 may include an RFID reader module instead of the bar-code reader module. In this case, the housing 19 of the peripheral device 7 may be configured not to have the reading window part 57. Alternatively, the peripheral device 7 may include an RFID reader module in addition to the bar-code reader module. Alternatively, a module incorporated into the peripheral device 7 may be a communication module represented by an IrDA infrared communication module. Furthermore, the module incorporated into the peripheral device 7 is not limited to the aforementioned modules, and may be another module that expands functions of a mobile information terminal.

Variation

A variation of the first cover 3*a* according to the above embodiment is described below with reference to FIGS. 12A, 12B, FIG. 13 and FIG. 14. A first cover 301*a* according to the variation is identical to the first cover 3*a* according to the above embodiment in that the first cover 301*a* includes a tray-shaped terminal fitting part 303, a recess-shaped device fitting part 305 provided in a bottom of the terminal fitting part 303, and a connector fitting part 307 provided in a frame part of the terminal fitting part 303. Meanwhile, the first cover 301a according to the variation is different from the first cover 3a according to the above embodiment in that the first cover 301a is made up of a soft cover 309 made of elastomer represented by silicon, and a hard cover 311 that is attached to an outside of the soft cover 309 and is made of a rigid plastic material represented by polycarbonate.

The soft cover 309 is made up of a first inner bottom part 313, a frame part 315, and an inner wall part 317.

The first inner bottom part 313 is formed so as to be compatible with the back surface 25 of the first terminal 5a connected to the peripheral device 7. Specifically, the first inner bottom part 313 has a plate shape that is identical to that of the exposed region of the back surface 25 of the first terminal 5a connected to the peripheral device 7. A hole 319 through which the camera lens 27 of the first terminal 5a is exposed is formed in the first inner bottom part 313 at a portion corresponding to the camera lens 27.

The frame part 315 is formed so as to be compatible with the peripheral surface 23 of the first terminal 5a. Specifically, the frame part 315 extends from an outer peripheral edge of the first inner bottom part 313 in a direction substantially perpendicular to the first inner bottom part 313. The extended length of the frame part 315 is slightly longer than the thickness of the first terminal 5a, and an end of the frame part 315 has a hook-shape that is curved inward. The frame part 315 and the first inner bottom part 313 function as the terminal fitting part 303 in which the first terminal 5a is fitted.

A recess 321 that is recessed toward an outside of the frame is provided in a lower part of the frame part 315. The recess 321 functions as the connector fitting part 307 in which the connector part 61 of the peripheral device 7 is to be fitted.

The inner wall part 317 is formed so as to be compatible with the peripheral surface of the peripheral device 7. Specifically, the inner wall part 317 extends from an inner peripheral edge of the first inner bottom part 313 in a direction opposite to the frame part 315, and is slightly curved inward. The inner wall part 317 is made up of an upper part 323, a lower part (not illustrated), a left part 324, and a right part (not illustrated). The upper part 323 has a cutout 325 in which the reading window part 57 of the peripheral device 7 is to be fitted. The left part 324 and the right part have switch housing parts 327 in which the switch parts 41 of the peripheral device 7 are to be housed.

The hard cover 311 is made up of a first outer bottom part 329, an outer wall part 331, a second bottom part 333, and a plurality of locking parts 335.

The first outer bottom part 329 has a plate shape that is substantially identical to the first inner bottom part 313 of the soft cover 309 so as to make close contact with the first inner bottom part 313.

The outer wall part 331 extends from an inner peripheral edge 329b of the first outer bottom part 329 and has a shape that is substantially identical to the inner wall part 317 of the soft cover 309 so as to make close contact with the inner wall part 317. Fitting parts 337 in which the switch housing parts 327 are to be fitted are provided in a left part 331L and a right part 331R of the outer wall part 331.

The second bottom part 333 is formed so as to be compatible with the back surface 53 of the peripheral device 7. Specifically, the second bottom part 333 has a rectangular plate shape and is provided along an end of the outer wall part 331 extending from the first outer bottom part 329. A hole 339 having the same size as the external shape of the holding base 55 of the peripheral device 7 is formed in the second bottom part 333 at a position corresponding to the holding base 55. Furthermore, a hole 341 having the same size as the external shape of the reading window part 57 of the peripheral device 7 is formed, at a position corresponding to the reading window part 57, in a region from an upper side of the second bottom part 333 to an upper part 331U of the outer wall part 331. The second bottom part 333 and the inner wall part 317 constitute the device fitting part 305 in which the peripheral device 7 is to be fitted.

The plurality of locking parts 335 are formed so as to be capable of locking the frame part 315 of the soft cover 309. Specifically, the locking parts 335 extend from upper, lower, left, and right ends of the outer peripheral edge 329a of the first outer bottom part 329. The locking parts 335 are disposed at portions corresponding to recesses 343 of an outer peripheral surface of the frame part 315 so as to be curved inward.

The plurality of locking parts 335 are engaged with the respective recesses 343 of the frame part 315, and thus the hard cover 311 is superimposed on the soft cover 309. This forms the first cover 301a. When the peripheral device 7 is fitted into the device fitting part 305 of the first cover 301a, the second bottom part 333 of the hard cover 311 makes close contact with the back surface 53 of the peripheral device 7, and the inner wall part 317 of the soft cover 309 makes close contact with the peripheral surface of the peripheral device 7. When the first terminal 5a is fitted into the terminal fitting part 303 of the first cover 301a, the first inner bottom part 313 makes close contact with the exposed part of the back surface 25 of the first terminal 5a, and the frame part 315 makes close contact with the peripheral surface 23 of the first terminal 5a. Furthermore, the recess 321 provided in the frame part 315 makes close contact with the connector part 61 so as to surround the connector part 61.

According to the first cover 301a according to the variation, it is possible to mitigate an external impact due to a dual structure constituted by the hard cover 311 and the soft cover 309. That is, a locally received impact is distributed to the whole first cover 301a by the outer hard cover 311, and the distributed impact is absorbed by the inner soft cover 309. Note that, the second cover 3b according to the above embodiment may have a configuration similar to the first cover 301a according to the variation.

The embodiment of the present invention has been described above, but the embodiment can be improved, changed, or modified in various ways on the basis of knowledge of a person skilled in the art without departing from the scope of the present invention, and such improvements, changes, and variations are encompassed within the scope of the present invention.

What is claimed is:

1. A cover set comprising:
a first cover; and
a second cover having a form that is different from the first cover,
the first cover and the second cover each having
a tray-shaped terminal fitting part configured to receive at least one of a plurality of mobile information terminals that are different from each other with regard to at least one of shape and size,
a recess-shaped device fitting part provided in a bottom portion of the terminal fitting part, and configured to receive a peripheral device that is electrically connectable to each of the plurality of mobile information terminals via a connector, the peripheral device having a first connector part to be connected to one of the plurality of mobile information terminals and a second connector part including a charging electrode, a connector fitting part configured to receive the first connector part, and a connector fitting hole configured to receive the second connector part, the terminal fitting part of the first cover and the terminal fitting part of the second cover being compatible with a different one of the plurality of mobile information terminals, respectively, and a shape and a size of the recess-shaped device fitting part being common to the first cover and the second cover.

2. The cover set according to claim 1, wherein
positions of the terminal fitting part and the device fitting part relative to the connector fitting part are common to the first cover and the second cover.

3. The cover set according to claim 1, wherein
the device fitting part of the first cover and the device fitting part of the second cover
each include
an inner wall portion that is made of elastomer and makes close contact with a peripheral surface of the peripheral device, and a bottom portion that is made of plastic, and covers the inner wall portion and a back surface of the peripheral device.

4. The cover set according to claim 1, wherein
the bottom portion of the terminal fitting part of the first cover has a first bottom wall, the bottom portion of the terminal fitting part of the second cover has a second bottom wall, the first bottom wall and the second bottom wall are different from each other with regard to at least one of shape and size, with the recess-shaped device fitting part whose shape and size are common to the first cover and the second cover being provided adjacent to each of the first bottom wall and the second bottom wall.

5. The cover set according to claim 1, wherein
the connector fitting hole is disposed in the device fitting part of each of the first cover and the second cover.

6. The cover set according to claim 5, wherein
a position of the connector fitting hole in the device fitting part is common to the first cover and the second cover.

7. The cover set according to claim 1, wherein
the second connector part is disposed inside or on a same level relative to an outer surface of each of the first cover and the second cover.

* * * * *